United States Patent

[11] 3,630,567

| [72] | Inventor | Peter D. Cook<br>93 Church Street, Alexandria Bay, N.Y. 13607 |
|---|---|---|
| [21] | Appl. No. | 836,836 |
| [22] | Filed | June 26, 1969 |
| [45] | Patented | Dec. 28, 1971 |

[54] DEVICE FOR MINIMIZING EFFECTS OF GLARE
1 Claim, 3 Drawing Figs.

| [52] | U.S. Cl. | 296/97 F |
|---|---|---|
| [51] | Int. Cl. | B60j 3/00 |
| [50] | Field of Search | 296/97 (.18); 240/7.1 |

[56] References Cited
UNITED STATES PATENTS

| 1,929,298 | 10/1933 | Wessels | 296/97 (.18) |
| 2,062,512 | 12/1936 | Hine | 296/97 (.18) |
| 2,785,287 | 3/1957 | Williams | 296/97 (.18) X |

FOREIGN PATENTS

| 158,402 | 8/1954 | Australia | 296/97 (.18) |
| 324,837 | 2/1930 | Great Britain | 296/97 (.18) |

*Primary Examiner*—Benjamin Hersh
*Attorney*—Craig, Antonelli & Hill

ABSTRACT: A device for installation in proximity to the windshield of a motor vehicle for reducing glare caused by sunlight reflected from parts of the motor vehicle in the daylight as well as the glare caused by headlights of oncoming vehicles after dark, including a selectively controllable artificial light source and a distributor for the light rays emanating therefrom, the distributor including a colored translucent surface through which the light rays are directed over the surface of the windshield from the interior thereof. According to an alternative embodiment of the present invention, the artificial light source may be connected to a voltage source through the foot-operated switch normally provided for adjusting the beam of the headlights.

PATENTED DEC28 1971 3,630,567
FIG.1
FIG.2
FIG.3
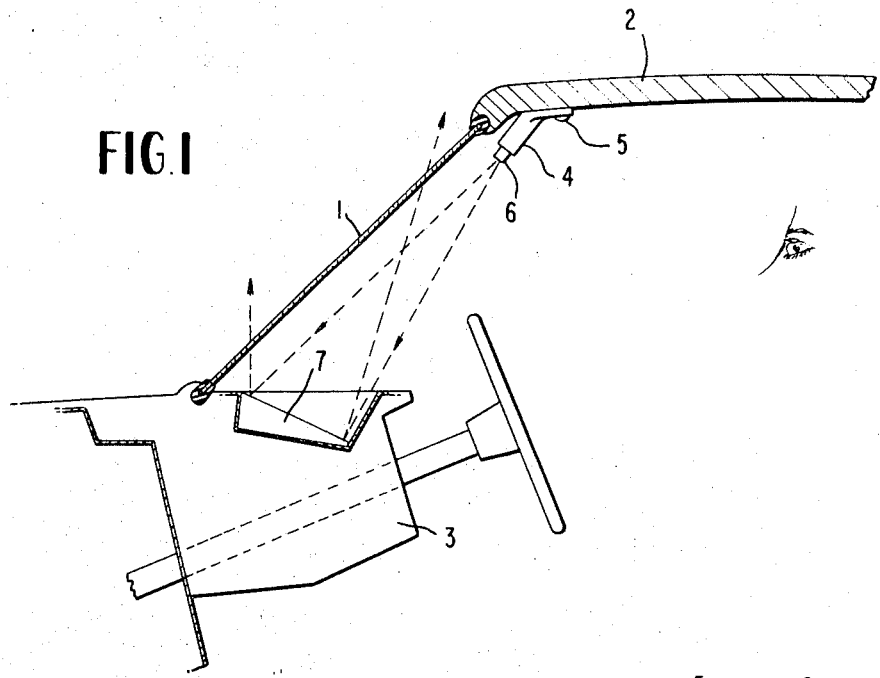
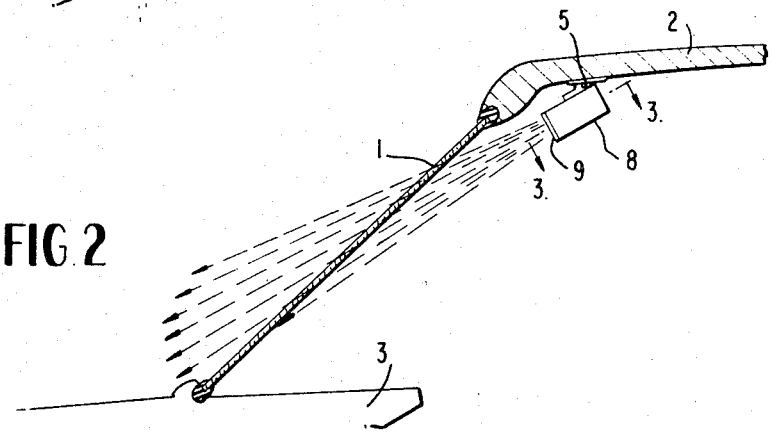
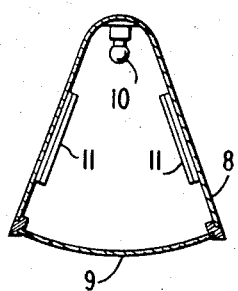
INVENTOR
PETER D. COOK

DEVICE FOR MINIMIZING EFFECTS OF GLARE

These proposed solutions have thus been less than completely successful in reducing the problems caused by sunlight glare. Moreover, none of these conventional means for overcoming sunlight glare has proven at all effective for reducing the harmful effects of glare created by headlights of oncoming vehicles at night. Toward this end, a number of devices have been developed, both manually and automatically controlled, for aiming the headlights down on the road when another vehicle approaches. None of these devices, however, is infallible and even when operating properly, these devices have no effect whatsoever on sunlight glare and the problems attendant thereto.

Accordingly, it is a primary object of the present invention to provide a device for installation in a motor vehicle which effectively reduces the vision-impairing glare caused both by sunlight and by headlights of approaching vehicles.

Further, it is an object of the present invention to provide a glare-reducing device which can be operated selectively by the driver or can be automatically operated.

It is still another object of the present invention to provide a device which effectively reduces the problems caused both by sunlight glare and headlight glare, which can be simply and inexpensively installed in older vehicles as well as new vehicles.

Finally, it is an object of the present invention to provide a device which is free of the inherent deficiencies of the conventional devices and, in particular, those attributable to the human element.

BACKGROUND OF THE INVENTION

Numerous accidents involving motor vehicles are attributable to impaired visibility of the operators caused by glare created by sunlight reflected from highly reflective surfaces of the motor vehicle in the daytime. Similar problems are created after dark by glare caused by headlights from oncoming vehicles.

In the past, efforts have been directed to reducing sunlight glare by the provision of tinted protective lenses to be worn by drivers and also to the development of totally or partially tinted windshields. While glare reducing lenses have been developed which are effective when worn by drivers, this has not served to eliminate the problem of accidents caused in part by sunlight glare, primarily because the effectiveness of such a solution depends upon the drivers's wearing of the lenses. Thus, for the same reasons that certain drivers neglect to utilize available safety belts, drivers also fail to procure and wear protective glare-reducing lenses.

Thus, the more fruitful efforts to eliminate sunlight glare as a major cause of auto accidents have been directed toward the provision of installations within the vehicle, thus eliminating the human element. However, the uniformly tinted windshields have not provided an effective solution, primarily because these have been thought to reduce visibility after dark. Similarly, sun visors and windshields tinted in the upper portion have failed to afford a desirable solution. This failure, however, can be attributed to the fact that the rays of the sun may be reflected from the hood or other highly reflective parts of the motor vehicle and pass unobstructed through the lower portion of the windshield.

SUMMARY OF THE INVENTION

The aforementioned objects and advantages are accomplished, in accordance with the present invention, by means of an artificial light source and a distributor for the light rays produced thereby, the distributor including a colored translucent lens, whereby colored light rays are projected over the windshield from the interior thereof.

In a preferred embodiment of the present invention, a bulb is positioned within a housing having a colored translucent lens at one end thereof. Reflectors are disposed on the interior of at least some of the lateral walls of the housing, which is secured to a fixed part of the vehicle such that the light rays passing through the lens are projected over the interior of the windshield, impinging upon the windshield at acute angles.

An alternative embodiment of the present invention incorporates a separate reflecting prism positioned to reflect light rays emanating from a bulb onto the windshield.

The present invention contemplates the provision of a separate, manually operable switch for controlling the artificial light source. The circuit may further include a selectively controllable rheostat. Alternatively, the bulb may be controlled by the foot-operated switch provided for adjusting the beam of the headlights.

BRIEF DESCRIPTION OF THE DRAWINGS

The aforementioned features, objects and advantages of the present invention will become more apparent from the detailed disclosure which follows, when considered together with the accompanying drawings, wherein:

FIG. 1 represents a side view, partially in section, of an automobile provided with one embodiment of the present invention;

FIG. 2 represents a view, similar to FIG. 1, of an automobile provided with another embodiment of the present invention; and FIG. 3 represents a view taken along line 3—3 of FIG. 2.

DETAILED DESCRIPTION OF THE DRAWINGS

As can be seen in FIG. 1, an automobile provided with a device in accordance with the present invention includes an artificial light source 4 secured, by any conventional means, to the roof 2 of a vehicle. The rays from light source 4 are projected through translucent lens 6 so that they impinge upon reflecting prism 7. Prism 7 is disposed, upon an instrument panel 3, such that the light rays from source 4 are reflected upon the windshield 1, the reflected rays impinging upon windshield 1 at acute angles. Prism 7 is preferably colored so that the rays reflected in windshield 1 are similarly colored.

In the embodiment illustrated in FIGS. 2 and 3, an artificial light source 10 is disposed within a housing 8 secured to the roof 2 of a vehicle, by any conventional means, at 5. The rays emanating from source 10 are directed, by reflectors 11 provided on the interior of the lateral walls of housing 8, thence through colored translucent lens 9, finally impinging upon windshield 1 at acute angles.

While two embodiments of the present invention have been illustrated in detail, it is to be understood that the scope of the invention is not limited to these specific embodiments, but is susceptible of numerous modifications as would be obvious to one with normal skill in the pertinent art.

I claim:

1. A device for installation in a motor vehicle for reducing glare caused by sunlight and headlights of approaching vehicles comprising an artificial light source, means for selectively controlling said artificial light source, means for securing said light source to the interior of the roof of the motor vehicle, and means including a colored reflecting prism positioned upon an upper surface of the instrument panel of the motor vehicle for distributing the light rays emanating from said light source upon the windshield of the motor vehicle, whereby said light rays impinge upon the windshield, from the interior thereof, at acute angles.

* * * * *